(12) United States Patent
Öttinger et al.

(10) Patent No.: US 6,565,099 B1
(45) Date of Patent: May 20, 2003

(54) MULTILAYERED GASKET WITH EYELIT

(75) Inventors: Oswin Öttinger, Meitingen (DE); Otto Mederle, Meitingen (DE)

(73) Assignee: SGL Carbon AG, Meitingen (DE)

( * ) Notice: Subject to any disclaimer, the term of this patent is extended or adjusted under 35 U.S.C. 154(b) by 0 days.

(21) Appl. No.: 09/244,835

(22) Filed: Feb. 4, 1999

(30) Foreign Application Priority Data

Feb. 4, 1998 (DE) .......................................... 198 04 289

(51) Int. Cl.$^7$ ................................................. F16L 17/06
(52) U.S. Cl. ...................... 277/608; 277/591; 277/592; 277/600; 277/627; 277/652
(58) Field of Search .................. 277/591, 592, 277/598, 600, 608, 609, 627, 652, 653, 654

(56) References Cited

U.S. PATENT DOCUMENTS

| 4,091,083 A | | 5/1978 | Hirschvogel et al. | |
|---|---|---|---|---|
| 4,795,166 A | | 1/1989 | Irmler | |
| 5,128,209 A | * | 7/1992 | Sakai et al. | 277/591 |
| 5,172,920 A | | 12/1992 | Schlenk | |
| 5,362,074 A | | 11/1994 | Gallo et al. | |
| 5,509,993 A | | 4/1996 | Hirschvogel | |
| 5,618,050 A | * | 4/1997 | Jeanne et al. | 277/591 |

FOREIGN PATENT DOCUMENTS

| DE | 25 36 939 | | 10/1976 |
|---|---|---|---|
| DE | 32 24 676 | A1 | 1/1984 |
| DE | 32 26 661 | A1 | 1/1984 |
| DE | 84 10 545.3 | | 8/1984 |
| DE | 33 39 434 | A1 | 5/1985 |
| DE | 37 02 452 | A1 | 8/1988 |
| DE | 37 27 036 | A1 | 2/1989 |
| DE | 297 17 457 | U1 | 1/1998 |
| EP | 0 197 301 | A2 | 10/1986 |
| EP | 0 263 402 | A2 | 4/1988 |
| EP | 0 303 068 | A3 | 2/1989 |
| EP | 0 616 884 | B1 | 9/1994 |
| EP | 0 676 570 | A1 | 10/1995 |
| GB | 1 522 172 | | 8/1978 |
| GB | 2 227 059 | A | 7/1990 |

OTHER PUBLICATIONS

Patent Abstracts of Japan No. 62–274165 A (Maenozono), dated May 22, 1986.
Patent Abstracts of Japan No. 6–58418 A (Murata), dated Aug. 5, 1992.
Published German Application No. 2 019 477, Reinz Gasket Company, flat gasket, in particular for combustion engines.
Published German Application No. DE–GM G 92 08 943.7.

* cited by examiner

*Primary Examiner*—Anthony Knight
*Assistant Examiner*—E Peavey
(74) *Attorney, Agent, or Firm*—Laurence A. Greenberg; Werner H. Stemer; Ralph E. Locher (57) ABSTRACT

A flat gasket includes a gasket body and at least one eyelet enclosing the gasket body. The gasket body is formed of a pressure-resistant core which is resistant to temperatures of at least 150° C. and a covering that completely covers flat outer sides of the core and is made of a gas-tight foil of an organic polymer having a long-term temperature resistance of at least 150° C. The eyelet or eyelets enclose the gasket body with a gas-tight joining. The core is formed of a plastic or elastomer reinforced with fibers and/or fillers, or it is formed of mica or graphite. If mica or graphite are used, the core is preferably formed of layers disposed alternately on top of one another and formed of graphite foils and metal foils or layers of mica and metal foils.

96 Claims, 8 Drawing Sheets

MULTILAYERED GASKET WITH EYELIT

BACKGROUND OF THE INVENTION

Field of the Invention

The invention relates to a flat gasket including at least one inner eyelet or at least one outer eyelet or at least one inner and one outer eyelet, as well as a gasket body. In each case the inner eyelet is positioned at a transition to each cavity to be sealed by the gasket. The gasket body having the at least one eyelet is formed of a pressure-resistant core which has long-term resistance to temperatures of at least 150° C. and a covering that is present on both flat outer sides of the core.

Flat gaskets are used in industry in order to seal spaces, such as pipelines, containers, reaction spaces, etc. containing fluid products, at locations at which such spaces have at least one transition to another structural or functional part of a technical assembly to which they belong and which is materially separated from the spaces. It is their function, where there are pressure differences between an interior of the container and a space outside the container to prevent an escape of fluids from such a container or system of containers or an unwanted penetration of fluids into the container or system of containers, as far as possible.

Moreover, even in the absence of pressure differences, exchanges of materials between the interior of the container and the exterior of the container as a result of diffusion should be prevented as far as possible. For economic reasons, for reasons of public health and because of the necessity for environmental protection, the demands placed on the efficiency and especially on the impermeability of flat gaskets have steadily increased in recent times and that process continues. If leakage limiting values in the vicinity of 0.01 mg/(m s) were adequate in the past, nowadays values of 0.0001 mg/(m s) are under discussion for the field of mineral oil processing. As a rule, such high requirements for impermeability can no longer be met by conventional single-material or single-layered flat gaskets. Sealing systems built up from several layers of different materials are also known. U.S. Pat. No. 5,128,209 describes a gasket material formed of layers of a fluoropolymer, graphite foils and metal foils, wherein the layers are bonded to one another by an adhesive. The object of developing that gasket material was to make a gasket which would be easy to handle and have a high spring back capacity. The criterion of impermeability was of secondary importance in that case. The layers of the fluoropolymer are formed of material which is porous and therefore permeable to fluids. They impart a greater stability, toughness and tensile strength and an improved ease of handling to that component of the composite formed of the graphite foils and the fluoropolymer foils. A great disadvantage of that gasket material is the permeability of the fluoropolymer foils to fluids combined with the presence of adhesives as bonding agents between the layers. The fluoropolymer foils contribute virtually nothing to the impermeability of the overall system, which has an adverse effect, especially in the case of gaskets for high and very high impermeability requirements. The adhesives can be a weak point, especially in the case of gaskets subjected to high pressures or stresses. That is because the layers of the laminate can slide on the adhesives, which can ultimately lead to the non-functioning of the gasket or, particularly in combination with more elevated temperatures, the adhesive layer can develop fine cracks which impair the sealing action. German Utility Model G 92 08 943.7 discloses packing rings for packed glands. The rings are formed of layers of graphite foils and of metal foils and have an at least partial covering of a foil of polytetrafluoroethylene as a diffusion barrier. The polytetrafluoroethylene foils can also be sintered onto the graphite rings. However, the mechanisms which bring about the sealing in gland packings are not readily transferable to flat gaskets. A gland packing is completely enclosed in its packing seat and is pressed against walls of the packing space surrounding it by tightening the packing seat. Unlike the case of flat gaskets, flow processes of the packing ring are provided for in that case and can only go as far as the space surrounding it allows. The metal rings disposed in the packing serve primarily as diffusion barriers between the graphite layers. The graphite layers have free diffusion paths in all directions. In flat gaskets the conditions are different. They are not completely enclosed and can have no, or only a very limited, tendency to flow where there is stressing of the sealing surfaces such as, for example, flanges, forming a boundary to them above and below. Fine channels and diffusion paths which pass horizontally through such gaskets control the leakage rate of those gaskets. Such diffusion paths are virtually absent in gaskets which have a core constructed only of plastics materials or of metal. However, gaskets of that type cannot meet the technical sealing demands placed on them, or only inadequately do so. In gaskets containing a pure plastics core, the plastics core flows under pressure and lacks an adequate spring back capacity. In gaskets containing a pure metal core, the metal core does not flow but it has no spring back capacity at all from the aspect of sealing technology and consequently does not have a reliable long-term sealing action. Other materials have therefore been used as gasket cores in order to surmount those difficulties. For example, such materials may be plastics having a certain elasticity, or special rubbers, for instance nitrile-butadiene rubber, which on one hand have been reinforced with fillers and by incorporating reinforcing fibers such as aramid fibers or carbon fibers, and on the other hand have been made flow-resistant or creep-resistant, or else inorganic materials such as, for example, graphite foils or graphite laminates. However, gasket cores of that type also have diffusion channels, as has been demonstrated, for instance, in Published European Patent Application 0 676 570 A1 by the example of graphite foil gaskets. In summary, it can be stated that the known flat gaskets do not completely meet the requirements of modern sealing technology with regard to impermeability and compressive strength and are in need of improvement.

SUMMARY OF THE INVENTION

It is accordingly an object of the invention to provide a gasket with an eyelet, which overcomes the hereinafore-mentioned disadvantages of the heretofore-known devices of this general type and which provides a flat gasket having high compressive strength, that is suitable for long-term temperature stability of at least 150° C. and through the use of which improved leakage values, that is of less than 0.01 mg/(m.s), are achieved. With the foregoing and other objects in view there is provided, in accordance with the invention, a flat gasket for sealing at least one cavity, comprising a gasket body including a pressure-resistant core having long-term resistance to temperatures of at least 150° C. and two flat outer sides, and coverings each completely covering a respective one of the flat outer sides, the coverings made of a gas-tight foil of an organic polymer having a long-term temperature resistance of at least 150° C.; and at least an inner eyelet or at least an outer eyelet or at least one inner and one outer eyelet or eyelet sheet, positioned at a transition between the gasket body and the at least one cavity and enclosing the gas-tight foil of the gasket body with a gas-tight joining.

Besides their low permeability to fluids, the polymer foils covering the core of the gasket body have yet another important property. Due to their good flow performance under pressure, they adapt themselves extremely well to the unevennesses and damage which are present on the surfaces to which they are sealed and thus also effect an excellent sealing against them. If they are used in a sufficiently low thickness in this case, their tendency to creep, which per se is disadvantageous for gaskets, and their low spring back capacity, are of no consequence, because the adverse effects caused thereby are more than compensated for by the core which, as will be shown below, has a good spring back capacity.

The polymer foils forming the boundary at the two flat surfaces of the multilayer sheet and completely covering it must have a long-term temperature stability of at least 150° C. They preferably have a long-term temperature stability of at least 200° C. and particularly preferably a long-term temperature stability of 250° C. Within the context of this invention, long-term temperature stability means that, at the specified temperature, the respective foil neither melts nor noticeably decomposes in air. All foils which possess these features are suitable for use as a component of the multilayer sheet according to the invention.

Nevertheless, in accordance with another feature of the invention, the foils are preferably formed of a material selected from the group including polyarylether ether ketone, polyaryl ether ketone, polyphenylene sulfide, polyaryl sulfone, polyether sulfone, polyimide, polyamide imide and fluorine-containing polymers. Particularly preferred materials are fluorine-containing polymers from the group including polytetrafluoroethylene, polytrifluorochloroethylene, tetrafluoroethylenehexafluoropropylene copolymer, copolymers of tetrafluoroethylene with perfluoroalkyl vinyl ether, copolymers of ethylene and tetrafluoroethylene and polyvinylidene fluoride. Of these foils, those formed of perfluorinated organic polymers are again preferred.

In accordance with a further feature of the invention, the polymer foils contained in the multilayer sheet have a thickness within a range of 0.005 to 1.0 mm, with thicknesses within a range of 0.03 to 0.2 mm being preferred.

In accordance with an added feature of the invention, in a first variant of the invention, the core of the gasket body can be formed of a thermoplastic synthetic material or of an elastomer reinforced by organic or inorganic fibers, preferably fibers having a length of not more than 20 mm. If the compressive strength of the plastics or elastomer body which is thus reinforced is inadequate, it can be brought to the required value by an additional content of a filler such as, for example, silicon dioxide, aluminum oxide, carbon, graphite in powder form or stone dust, ceramic dust or wood dust.

In accordance with an additional feature of the invention, the reinforcing fibers of the core are preferably aramide fiber, carbon fiber, graphite fiber, glass fiber, ceramic fiber or metal fiber.

In accordance with yet another feature of the invention, the thermoplastic synthetic material is a plastics material selected from the group including polyarylether ether ketone, polyaryl ether ketone, polyphenylene sulfide, polyaryl sulfone, polyether sulfone, polyimide, polyamide imide and fluorine-containing polymers. In particular, it is a plastics material selected from the group including polytetrafluoroethylene, polytrifluorochloro-ethylene, tetrafluoroethylene-hexafluoropropylene copolymer, copolymers of tetrafluoro-ethylene with perfluoroalkyl vinyl ether, copolymers of ethylene and tetrafluoroethylene and polyvinylidene fluoride. The elastomer used is preferably a material selected from the group including nitrile-butadiene rubber, styrene-butadiene rubber, natural rubber, ethylenepropylene terpolymer, ethylene-vinyl acetate copolymer, fluorinated rubber, fluorosilicone rubber, vinyl-containing dimethylpolysiloxane, acrylic rubber and ethylene-acrylic rubber.

In accordance with yet a further feature of the invention, in a second and preferred variant of the invention, the core of the gasket body is formed of an inorganic and pressure-resistant material selected from the group including graphite and mica. In a particularly preferred variant, it is formed of a variety of graphite which has been produced from expanded graphite, is available in foils or in laminate form and is well-known to the person skilled in the art, or it contains such a variety of graphite. For the purpose of this invention, the term "graphite foils" means both graphite foils and graphite laminates. These are obtained by known processes by compression or calendering of expanded, so-called vermicular graphite. Expanded graphite is produced by sudden decomposition of graphite salts, such as graphite hydrogen sulfate, at elevated temperatures. Vermicular graphite can be produced, for example, by the process disclosed in U.S. Pat. No. 4,091,083.

In accordance with yet an added feature of the invention, the graphite foils used for the production of gasket bodies according to the invention and situated in these gasket bodies can have a bulk density within a range of 0.1 g/cm$^3$ to 1.8 g/cm$^3$. The graphite foils situated in the gasket bodies more probably have bulk densities which are in the middle and upper range of the specified bulk density values. They have a carbon content preferably within the range of 90 to 99.95 per cent by weight. Their thickness is within the range of 0.1 mm to 4 mm. Where graphite foils alone are used, the core of the gasket body may be formed of only one layer of graphite foil or of several layers disposed one above the other.

In accordance with yet an additional feature of the invention, the core is formed of different layers disposed alternately on top of one another and in parallel, including a layer made of an inorganic, pressure-resistant material which is resistant to high temperatures and metal foils. It is advantageous if the metal foils in the core are joined to the layers of inorganic, pressure-resistant material which is resistant to high temperatures. This bond can be produced by an adhesive which is resistant to temperatures of above 150° C. In a more developed variant of this structure of the core, the two layers directed to the outside, that is the upper and the lower layer of the core, are each formed of a metal foil completely covering the flat surfaces facing towards it of the layers of the core adjacent it.

In accordance with again another feature of the invention, the inorganic, pressure-resistant material which is resistant to high temperatures is formed of mica. In a particularly preferred embodiment of this variant of the invention, the inorganic, pressure-resistant material which is resistant to high temperatures is formed of at least one graphite foil. In order to provide particularly efficient gaskets, there is a joining of the graphite foils to the metal foils and there is also a joining of the metal foils to the polymer foils of the covering, which are free of adhesives.

In accordance with again a further feature of the invention, in all embodiments containing graphite foils and metal foils, the metal foils which are not joined to polymer foils of the covering can be shaped in the form of tanged metal sheets, from which tines extend either on only one side or on both sides. Preferably, only the metal foil forming the center of the core is a tanged metal sheet having tines on both sides, which are anchored into the two adjacent graphite foils.

In one method for joining metal foils and graphite foils without an adhesive, the two foils are brought into contact at the surfaces by which they are to be bonded together and are compressed by applying pressure and temperatures within the range of 150° C. to 300° C. In the case of smaller expanses of surfaces, this can be done in stamping presses. In the case of large lengths, heatable twin-belt presses or roll mills are used. If one wishes to produce an extremely firmly adhering joining between the metal foils and the graphite foils, one will use the process according to European Patent EP 0 616 884 B1, corresponding to U.S. Pat. No. 5,509,993, as another method which is preferred. In that method, the surfaces to be joined together are coated with as thin a layer as possible of a substance acting per se as a separating agent and the joining is produced by pressure and the effect of temperature.

In accordance with again an added feature of the invention, a flat gasket regarded as advantageous because of its limited number of layers, has a gasket body formed of a centrally disposed metal foil, two layers of graphite foil joined to the flat surfaces of this metal foil and two metal foils joined to the flat outwardly-directed surfaces of the two graphite foils, wherein the flat outwardly-directed surfaces of these metal foils are completely joined to a polymer foil. Another gasket of this type has a gasket body made of a centrally disposed graphite foil, both of the flat surfaces of which are each joined to a metal foil, and the two outwardly-directed surfaces of which are completely covered with a polymer foil.

The core of the gasket body is always joined to the covering. In order to produce this joining, either an adhesive is used or a joining is produced without an adhesive. Adhesives are used in particular for bonding polyimide foils to the core. The adhesives that are used can be commercially available adhesives which are resistant to temperatures of above 150° C., such as silicone adhesives or acrylic adhesives. Joinings without an adhesive are preferred, since the layers of adhesive invariably constitute a certain weakness in the gaskets. That is because in those layers they can form fine cracks which act as diffusion channels, or because adhesives which do not cure to form thermosetting networks, under high pressure and possibly at elevated temperatures, act as a lubricant for the layers of material which are bonded to one another. Such a joining without an adhesive between the core and the covering is formed by pressing the polymer foil forming the covering to at least one layer of the core or to a foil which will subsequently become a component of the core, such as, for example, a metal foil or a graphite foil, at a temperature at which the polymer foil softens and at a pressure at which the joining can then be produced. In the course thereof the core becomes welded to the polymer foil.

This process can also be used for foils made of polytetrafluoroethylene. Stamping presses as well as twin-belt presses or roll presses are suitable for the production of joinings of this kind. In order to provide economical operation, it is advantageous to use pressing devices in which at least one of the foils to be joined, for example by tempered rolls, can be heated and in which the pressure required for joining can be applied continuously.

In accordance with again an additional feature of the invention, the metal foils of the gasket body may be formed of any metal which is capable of being used for sealing purposes and of being produced in foil form. It is, however, preferable to use metal foils made of aluminum, aluminum alloys, copper and copper alloys and of a corrosion-resistant metal or of a corrosion-resistant metal alloy such as, for example, foils made of special steel. The metal foils have a thickness preferably within a range of 0.005 to 1 mm. In special cases the thickness may be outside this range.

The advantageous properties of the gasket body are most effective in the flat gasket only if at least the inner eyelet is, or the inner eyelets are, constructed and attached in such a way that it or they surround the gasket body completely and render it gas-tight. The eyelet or eyelets can be attached through the use of known devices. The eyelets can be formed of metal or of a suitable plastics material. Preferably, eyelets made of a corrosion-resistant metal or of a corrosion-resistant metal alloy are used. Eyelets made of plastics material are preferably formed of a perfluorinated organic polymer. In this case a conclusive joining, produced by welding or contact adhesion, between the eyelet and the polymer foil forming the covering, is advantageous for producing gas-tight conditions.

In accordance with a concomitant feature of the invention, the flat gaskets have at least a leakage rate in accordance with DIN 3535 of less than/equal to 0.1 ml/min.

Other features which are considered as characteristic for the invention are set forth in the appended claims. Although the invention is illustrated and described herein as embodied in a multilayered gasket with an eyelet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
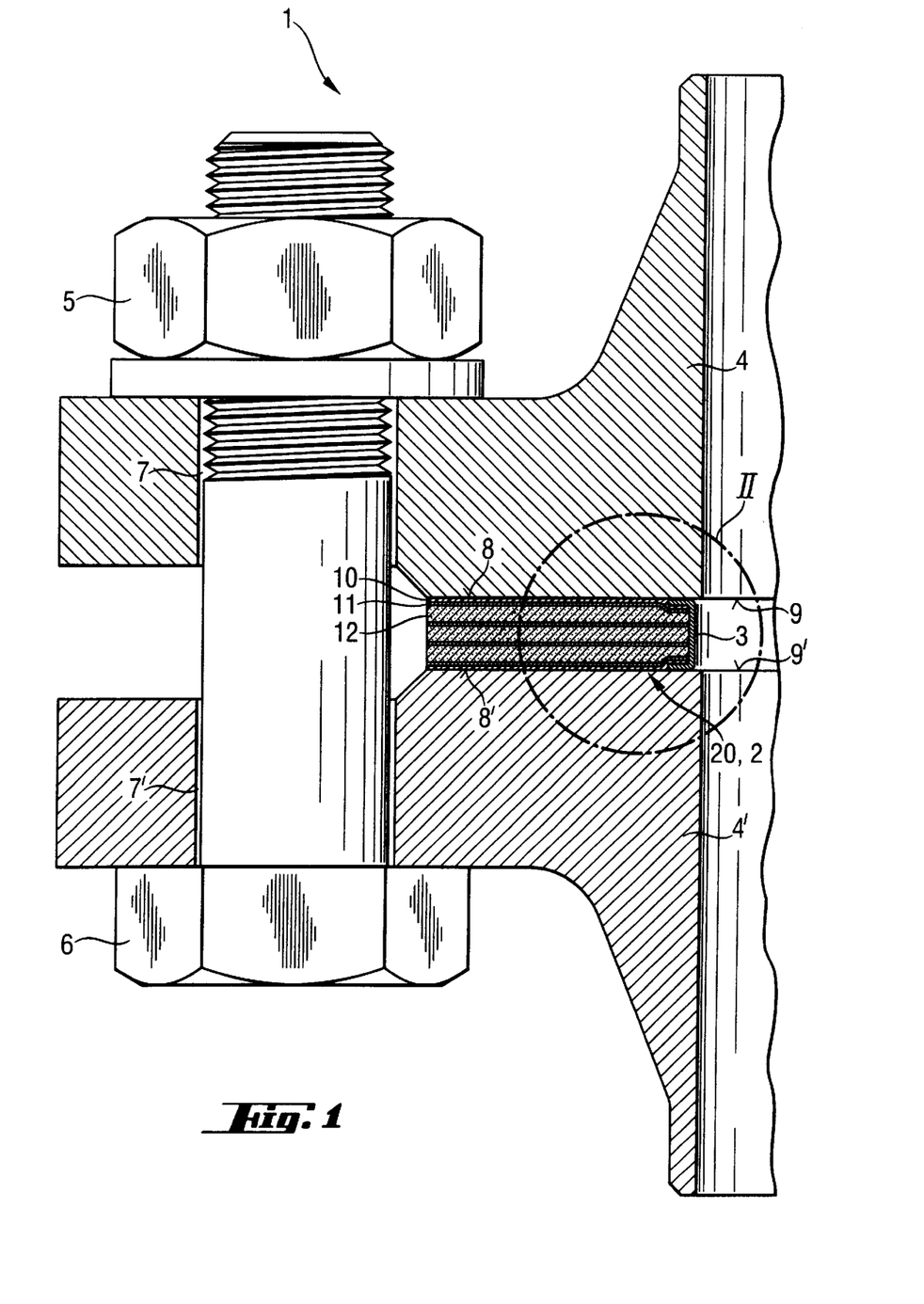
FIG. 1 is a fragmentary, diagrammatic, transverse-sectional view of a flanged joined in a pipe having a flat gasket with an inner eyelet.

Referring now to the figures of the drawings in detail and first, particularly, to FIG. 1 thereof, there is seen a transverse section through a flanged joined 1 in a pipe with a flat gasket 2, 20 having an inner eyelet 3. The flat gasket 2, 20 is situated between two flanges 4, 4'. Bolts 6 are provided with nuts 5 and are inserted through bores 7, 7' in the flanges 4, 4'. The flanges 4, 4' are moved towards one another by tightening the bolts 6 and thus a pressure is exerted on the flat gasket 2, 20, in such a way that flat surfaces 8, 8' of the gasket 2, 20 are pressed against sealing surfaces 9, 9' of the flanges 4, 4', thus forming a seal.

Figure 2A:
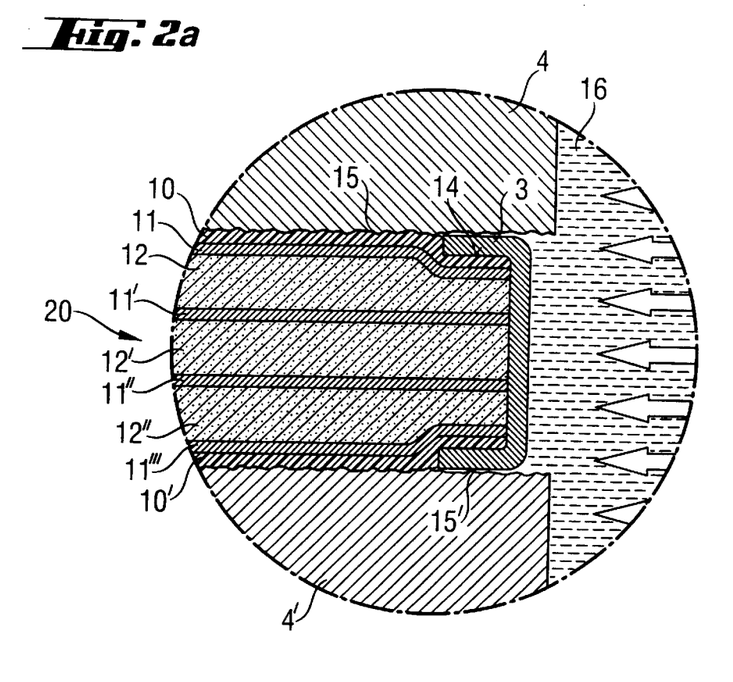
FIGS. 2a and 2b are enlarged views of a portion II of the transverse-sectional view represented in FIG. 1, showing the flat gasket in a sealing position, wherein the gasket reproduced in FIG. 2a is constructed with a covering according to the invention, whereas the gasket represented in FIG. 2b does not come under the invention.
Figure 2B:
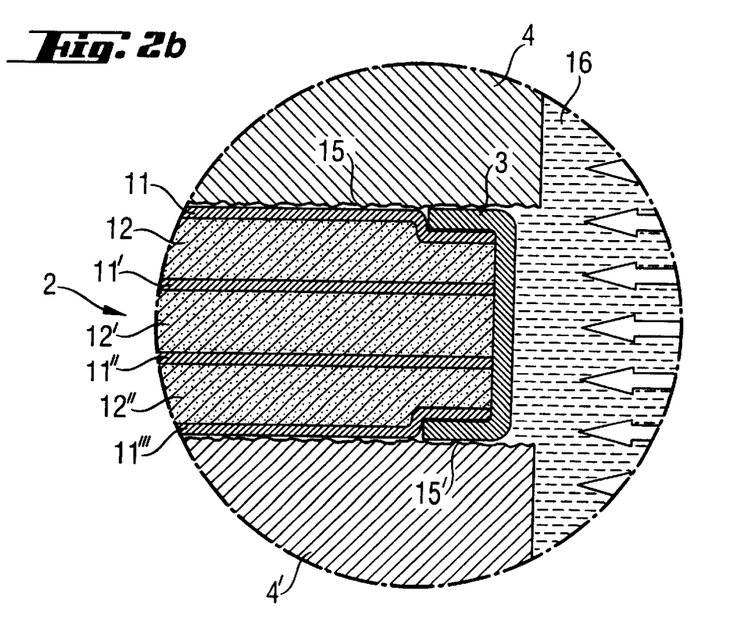

FIGS. 2a and 2b contain details of the transverse section represented in FIG. 1, showing the flat gasket 2, 20 in a sealing position.

FIG. 2a shows a flat gasket 20 according to the invention. The flat gasket 20 has a gasket body which includes a covering 10 that is made of a polymer foil and is joined to one side of a metal foil 11, as viewed from the outside inwards. The other side of the metal foil 11 is joined to an outer side of a graphite foil 12 and the latter is again joined on an inner side to a metal foil 11'. A central layer of the gasket 20 is formed of a graphite foil 12', having one flat surface that is joined to the metal foil 11' and another flat surface which is joined to one flat surface of a metal foil 11". The metal foil 11" has another flat surface joined to a graphite foil 12" and the latter has an outwardly-directed flat surface joined to a metal foil 11'''. An outwardly-directed flat surface of the metal foil 11''' is joined to a polymer foil covering 10'. An entire inner edge of the flat gasket 20 is enclosed by an inner eyelet 3. This inner eyelet is sealed to the covering 10, 10' by a gas-tight joining 14 at the top side and the underside of the gasket 20. The flat gasket 20 is constructed symmetrically. The surfaces of the flanges 4, 4' facing towards the flat gasket 20 have unevennesses 15, 15', into which the free-flowing but thin covering 10, 10' formed of a thermoplastic polymer penetrates under the pressure of the flanges 4, 4'. Consequently, all leakage paths for a medium 16 which is to be sealed off are reliably barred by sealing. FIG. 2b shows a configuration of a gasket 2 not coming under the invention, but which, as far as the core of the gasket body of the flat gasket 2 is concerned, is similar in its characteristics to those described with regard to FIG. 2a. That is, the gasket 2 in FIG. 2b lacks the comparatively flexible, gas-tight covering 10, 10' of the gasket 20 described under FIG. 2a. The flat gasket 2 has two sealing outer surfaces which are part of metal foils 11, 11'''. Those metal foils cannot be pressed into the unevennesses 15, 15' of the flanges 4, 4' during stressing of the flanges 4, 4'. As a consequence thereof, there are leakages which may become excessive in the case of high internal pressures of the medium 16 which is to be sealed off.

Figure 3:
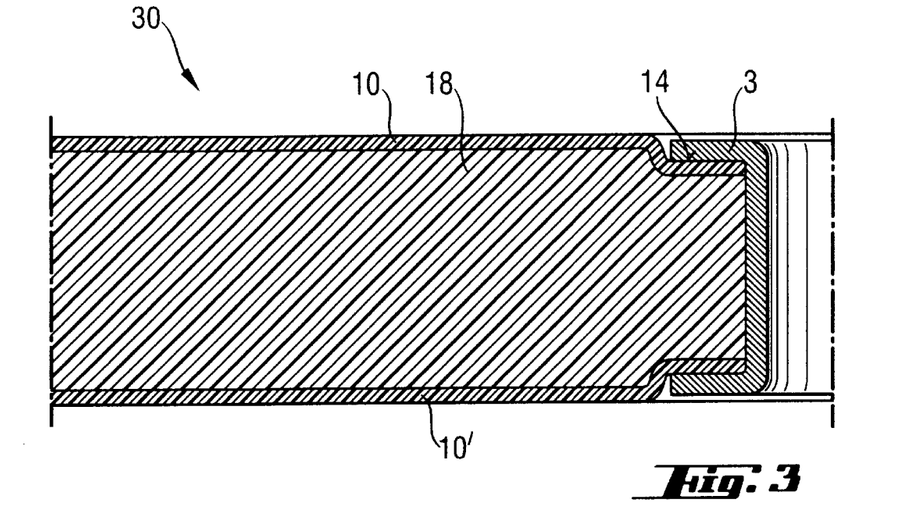
FIGS. 3 to 12 are transverse-sectional views of different embodiments of the flat gaskets according to the invention.

FIG. 3 shows a flat gasket 30, which is formed of a core 18 made of butadiene-nitrile rubber that is reinforced with short aramide fibers and contains graphite flakes as a filler in order to decrease the tendency to flow. The core 18 is joined to coverings 10, 10' made of polyether ketone foils. The gasket 30 has an inner eyelet 3, which encloses an entire inner edge of the gasket 30 and is sealed by a gas-tight joining 14 to the coverings 10, 10'.

Figure 4:
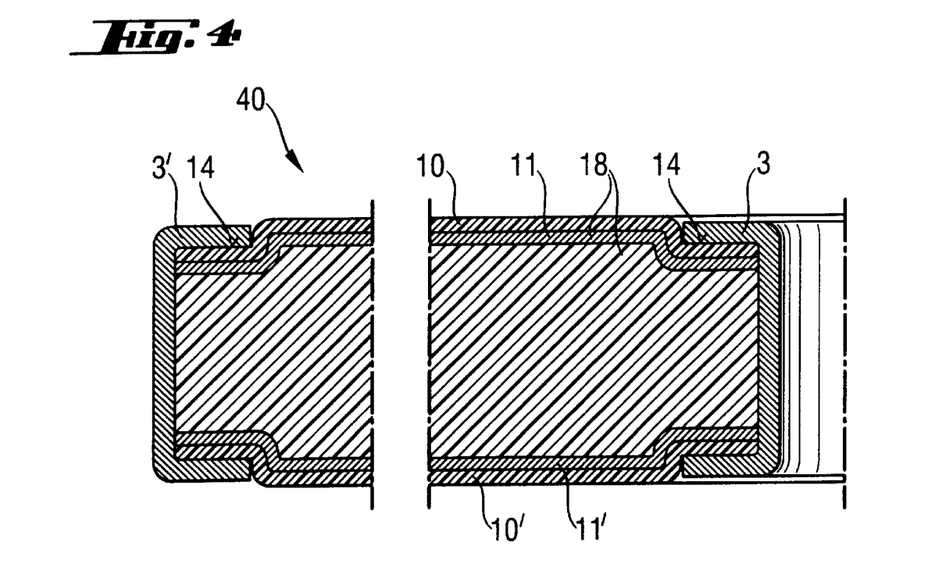

FIG. 4 shows a flat gasket 40, in which the core 18 of the gasket body is formed of: 1. a layer of vinylidene fluoride-hexafluoropropylene copolymer, which is reinforced with short graphite fibers and additionally contains graphite powder as a filler; and 2. two metal foils 11, 11' of aluminum, which completely cover the layer of the vinylidene fluoridehexafluoro-propylene copolymer on both of the flat surfaces. Two flat outwardly-directed surfaces of the aluminum foils 11, 11' are joined without an adhesive to coverings 10, 10' made of polyether ketone foils. The gasket body is enclosed at the inside of the gasket by an inner eyelet 3 and at the outside by an outer eyelet 3'. The two eyelets form a gas-tight joining 14 with the coverings 10, 10' of the gasket body.

Figure 5:
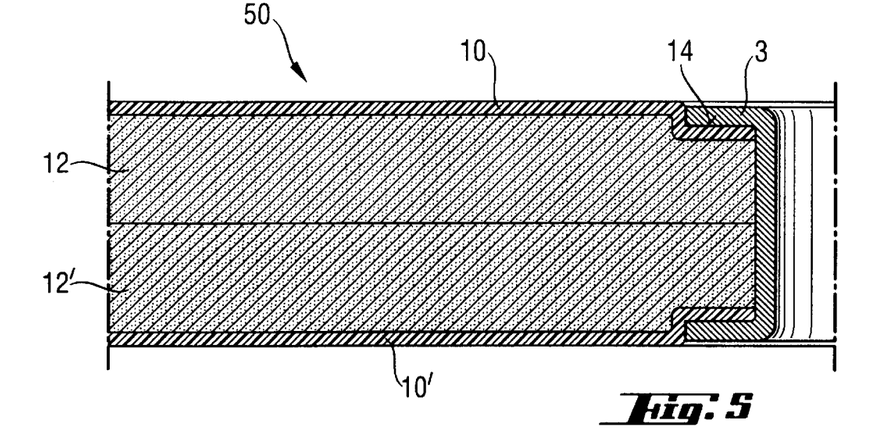

FIG. 5 shows a flat gasket 50 with an inner eyelet 3, which is formed of a copolymer of tetrafluoroethylene and perfluoroalkyl vinyl ether, that borders the gasket body and is sealed by a gas-tight joining 14. The core of the gasket body is formed of two laminates 12, 12' joined together by compression and produced from expanded graphite. This graphite core is joined without an adhesive, on its upper and on its lower flat surfaces, to coverings 10, 10' made of polytetrafluoroethylene foils.

Figure 6:
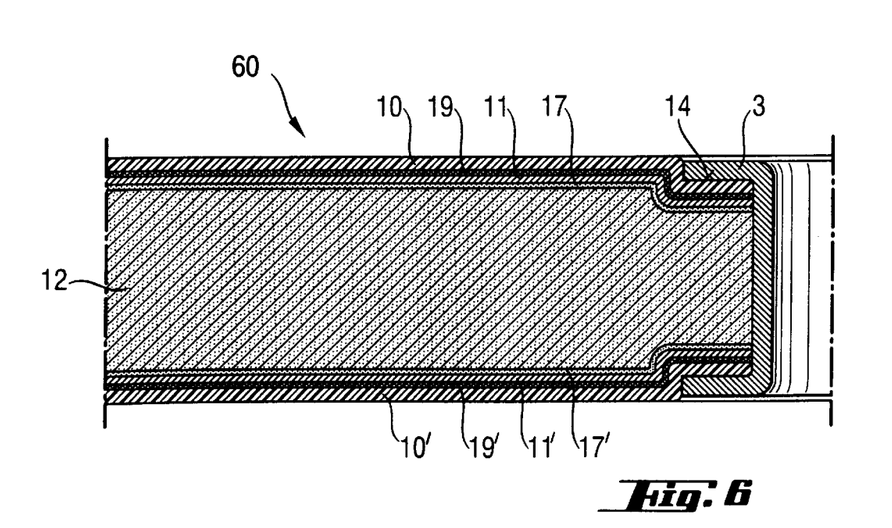

A flat gasket 60 containing an inner layer formed from a graphite laminate 12 is shown in FIG. 6. Two flat surfaces of this laminate 12 are bonded through the use of an epoxy resin adhesive 17, 17' to metal foils 11, 11' made of copper. The graphite laminate 12 and the two metal foils 11, 11' form the core of the gasket body. Two free flat surfaces of this core are each bonded to a covering 10, 10' made of a polyimide foil through the use of a contact adhesive foil or adhesive foil 19, 19' made of a copolymer of polytetrafluoroethylene and perfluoroalkyl vinyl ether. The inner eyelet 3 made of special or stainless steel encloses the entire gasket body along its inner edge and is sealed by a gas-tight joining 14 to the coverings 10, 10'.

Figure 7:
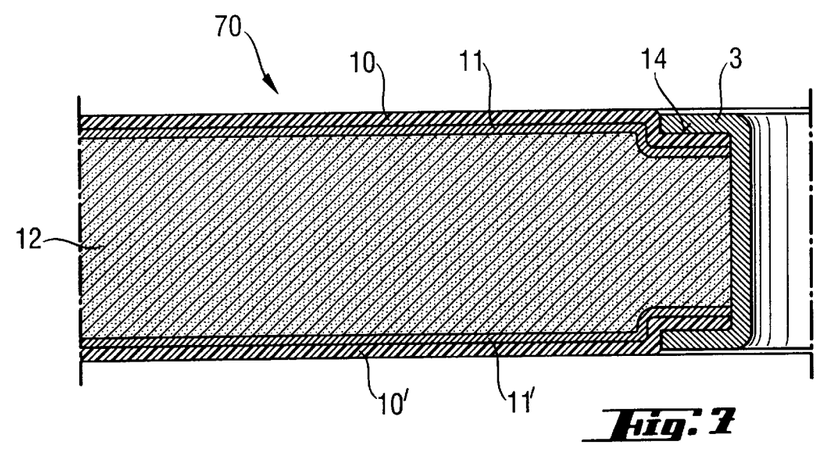

A flat gasket 70 which is illustrated in FIG. 7 is similar to the flat gasket 60 in FIG. 6. The gasket 70 differs from the gasket 60 in FIG. 6 in that the joinings of the gasket 70 between the graphite laminate 12 and the metal foils 11, 11' and those between the metal foils 11, 11' and the coverings 10, 10' were produced without the use of adhesives or of foils acting as adhesives. In this case the joinings were produced by applying high temperatures combined with a suitable pressing pressure.

Figure 8:
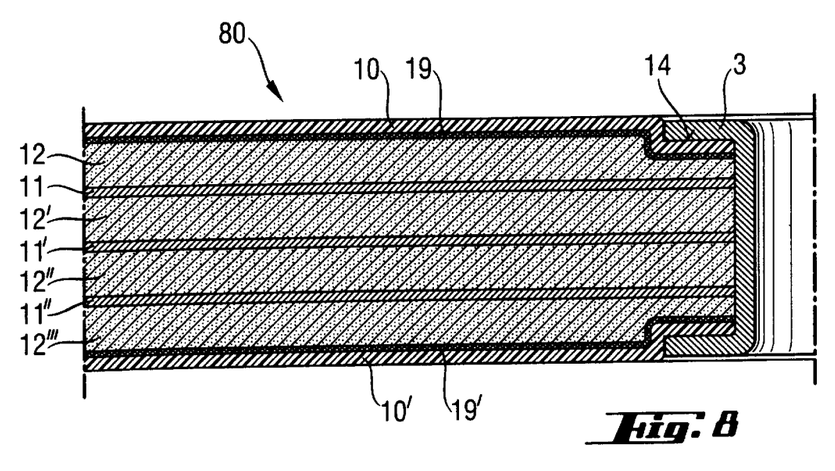

FIG. 8 shows a flat gasket 80, with an inner eyelet 3 sealing the coverings 10, 10' through a gas-tight joining 14. The gasket body is formed of a sequence of four layers of graphite foils 12, 12', 12", 12''' and three layers of metal foils 11, 11', 11" made of special steel. The joining between the graphite foils 12, 12', 12", 12''' and the metal foils 11, 11', 11" was produced by compressing the components at elevated temperature and high pressure. The flat outwardly-directed surfaces of the gasket body are joined to coverings 10, 10' that are each made of a polytetrafluoroethylene foil. A foil 19, 19' made of a tetrafluoroethylene-perfluoropropylene copolymer was used as a joining agent between the graphite foils 12, 12''' and the polymer foils 10, 10'. This joining between the graphite and the polymer was produced at elevated temperature and increased pressure.

Figure 9:
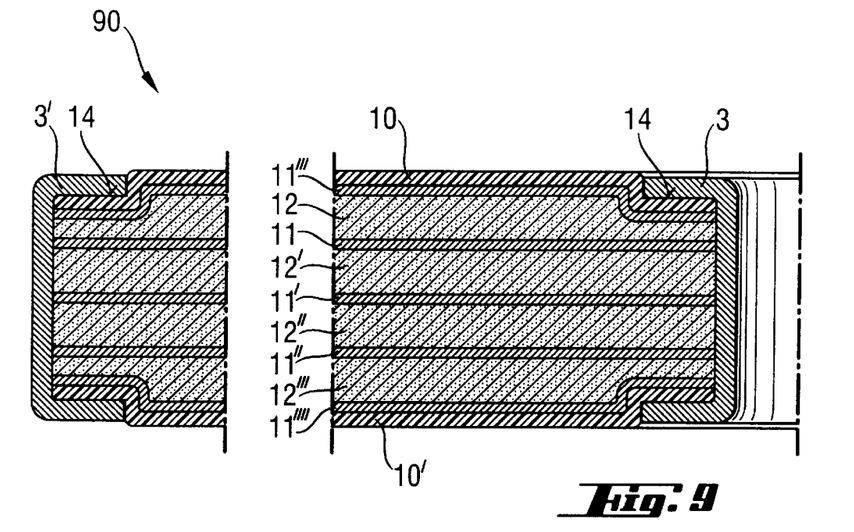

FIG. 9 shows a flat gasket 90 with an inner eyelet 3 and an outer eyelet 3' both made of special steel. The eyelets enclose the gasket body at its inside edge and at its outside edge in a gas-tight manner. The interior of the core of the gasket body corresponds to the core of the gasket body of the flat gasket 80 of FIG. 8. However, the core of the gasket body of the flat gasket 90 in FIG. 9 additionally has two metal foils 11''', 11'''' made of special steel, which are respectively joined without an adhesive to the adjacent graphite foils 12, 12'''. The special steel foils 11''', 11'''' are welded on their flat outwardly-directed surfaces to coverings 10, 10' made of foils formed of a copolymer of tetrafluoroethylene and perfluoropropylene. In the production, first of all the combination of the metal foils 11''', 11'''' and the polymer foils 10, 10' was constructed and then the free metallic flat surfaces of these combined sheets were joined to the inner part of the core of the gasket body formed of the graphite foils 12, 12', 12''', 12''' and the metal foils 11, 11', 11".

Figure 10:
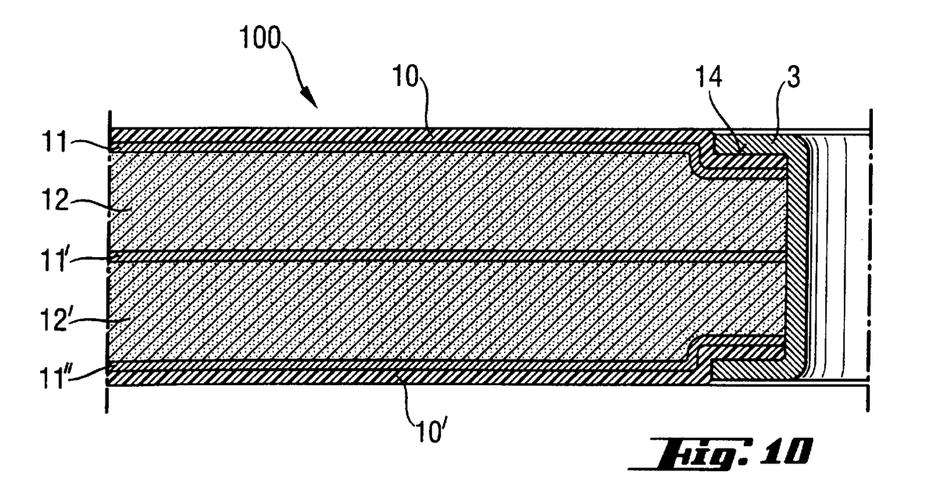

A flat gasket 100 shown in FIG. 10 has an inner eyelet 3 again enclosing a gasket body and is sealed by a gas-tight joining 14 to coverings 10, 10'. The core of the gasket body includes two graphite foils 12, 12' and three metal foils 11, 11', 11" made of special steel. These foils are disposed in such a way that a central metal foil 11' is joined to two graphite foils 12, 12' and flat outwardly-directed surfaces of the two graphite foils 12, 12' are in turn joined to two metal foils 11, 11". The graphite foils 12, 12' were joined to the metal foils 11, 11', 11" by the process according to European Patent EP 0 616 884 B1, corresponding to U.S. Pat. No. 5,509,993. The coverings 10, 10' of the gasket body are formed of two polytetrafluoroethylene foils, which are heat-welded to the adjacent metal foils 11, 11".

Figure 11:
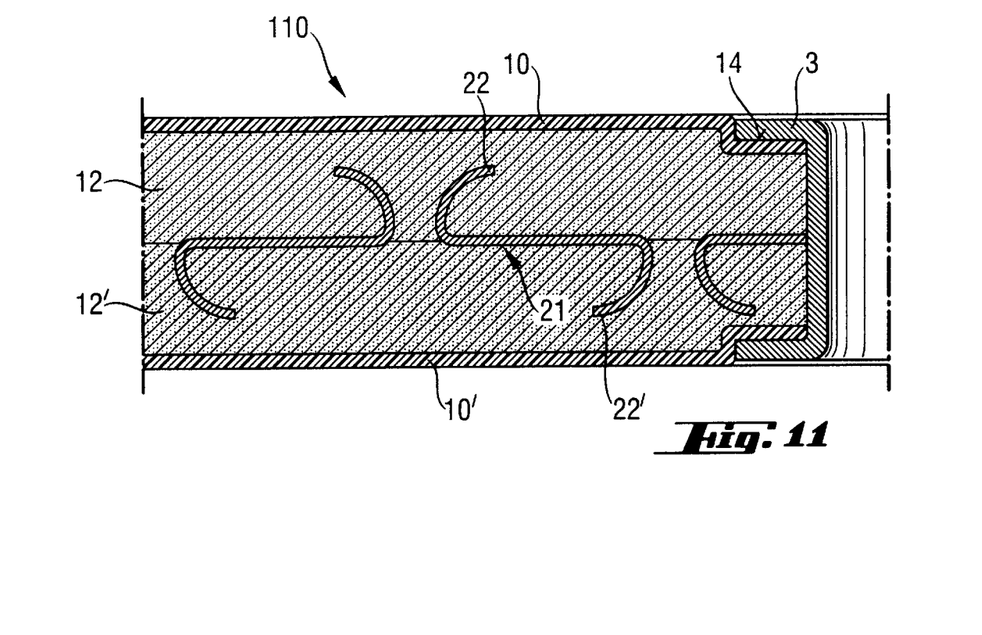

FIG. 11 shows a flat gasket 110 with a gasket body having a core which is formed of two graphite foils 12, 12' and a tanged metal sheet 21 made of special or stainless steel. Tines 22, 22' on both sides of the tanged metal sheet 21 engage the graphite foils 12, 12'. The gasket body is bounded on its outer flat surfaces by two coverings 10, 10' made of polytetrafluoroethylene foils, which are joined without an adhesive to the graphite foils 12, 12' adjacent them. The inner eyelet 3 made of special steel encloses the gasket body and is sealed by a gas-tight joining 14 to the coverings 10, 10'.

Figure 12:
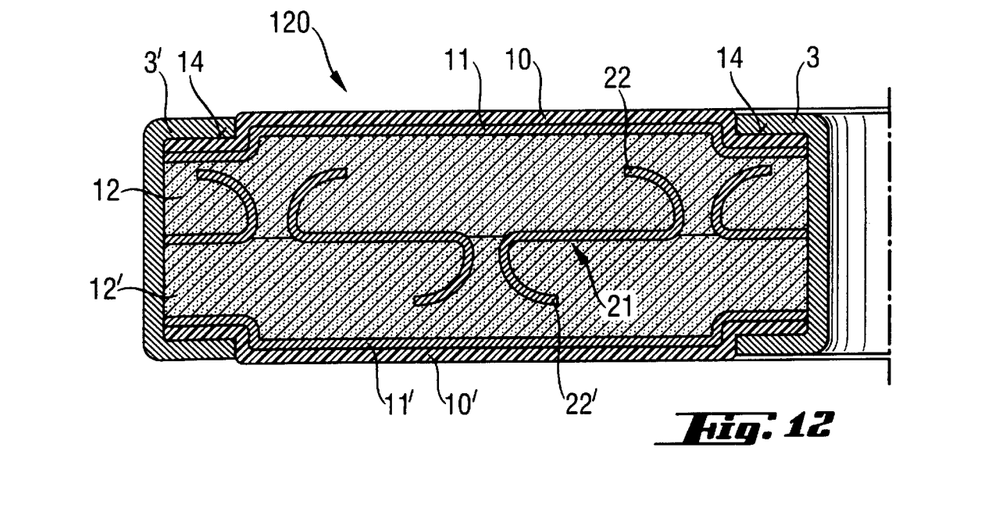

In FIG. 12, a flat gasket 120 having an inner eyelet 3 and an outer eyelet 3' is represented in the form of a transverse section through the left half of the gasket 120. The eyelets 3, 3', which are formed of special steel, overlap the coverings 10, 10', that are each formed of a polytetrafluoroethylene foil, along the entire inner periphery and the entire outer periphery of the gasket 120 and are sealed along these zones by a gas-tight joining to the coverings 10, 10'. In this way a double safeguard against leakages is achieved. That is to say, should some gas still enter the gasket body through the inner eyelet 3, while the gas is under a great internal pressure, then the pressure of the gas will be drastically decreased during passage through the gasket 120 and will be so low at the configuration of the outer eyelet 3', that at that point no more gas will be able to escape.

The core of the gasket body is formed of two graphite foils 12, 12', which are reinforced by a tanged metal sheet 21 disposed therebetween. Tines 22, 22' of the tanged metal sheet 21, which are situated on both sides of the latter, are anchored in the graphite foils 12, 12'. The core is sealed towards the outside by two metal foils 11, 11' made of special steel, which are joined without an adhesive to the graphite foils 12, 12' adjacent them. The flat surfaces of the core, which are part of the metal foils 11, 11', are heat-welded to the two coverings 10, 10' formed of polytetrafluoro-ethylene foils.

EXAMPLES

Example 1

Production of a flat gasket having the structure shown in FIG. 12. In order to produce the core of the flat gasket, two webs of graphite foil, having a thickness of 1.05 mm and a bulk density of 0.9 g/cm$^3$, and a tanged metal sheet provided with tines on both sides and made of special steel, material no. 1.4401, which had a sheet thickness of 0.1 mm, were rolled together through the use of a generally known process, in a roll mill having two rolls that had been adjusted to a gap width of 1.9 mm. The rolling was carried out in such a way as to produce a graphite foil body reinforced with a tanged metal sheet and having a graphite foil on both sides with a bulk density of 1.0 g/cm$^3$. Independently of the joining of the tanged metal sheet to the two graphite foils described above, a 50 μm thick foil made of special steel, material No. 1.4401, having a surface roughness $R_z$ of approximately 10 μm, was joined without an adhesive to a likewise 50 μm thick polymer foil made of polytetrafluoroethylene (TFM 1700, manufactured by Dyneon, Burgkirchen, Germany). The joining was carried out in a hot press using press plates with high plane-parallelism which had hard-chrome plated, polished surfaces, that had been coated with a release agent. The two press plates were at a temperature of approximately 370° C. The metal foil coated with the polymer foil was placed in the press and compressed for 5 minutes under a pressing power of 2 MPa. The metal foil/polymer foil composite was removed from the press and this composite was cooled to room temperature. After the removal and cooling, the free metal surface of the metal foil/polymer foil composite was coated with a thin layer of a mixture of a siloxane emulsion and a fatty alcohol according to European Patent EP 0 616 884 B1, corresponding to U.S. Pat. No. 5,509,993, for the purpose of joining to the graphite foil body reinforced with the tanged metal sheet. After the emulsion/fatty alcohol mixture had been dried, a stack having the following layer structure was assembled in order to produce the gasket body:
1. composite sheet made of polymer foil and metal foil,
2. graphite foil body reinforced with a tanged metal sheet,
3. composite sheet made of polymer foil and metal foil.

In the stack, the polymer foils of the polymer foil/metal foil composite are always directed to the outside and the metal surfaces covered with the siloxane emulsion/fatty alcohol mixture are always directed towards the graphite side of the graphite foil body reinforced with the tanged metal sheet. The stack was then transferred to a heated stamping press and compressed for approximately 1 hour at a surface pressure of 7 MPa and a temperature of 200° C. Measurements were carried out on parts cut out of this gasket body, the results of which are reported below. In order to produce the gaskets, circular rings having an internal diameter of 49 mm and an external diameter of 92 mm were punched out of the gasket body. These sealing rings were provided in one variant with an inner eyelet and in the other variant with an inner and an outer eyelet. The eyelets were formed of special steel (material No. 1.4571, thickness 0.15 mm). They were produced by using a conventional bordering device, with a bordering tool being set in such a way that there was a gas-tight seal between the inner surfaces of the upper and the lower edges of the eyelet and the surfaces of the opposing polymer foil coverings.

Example 2

This example describes the production of a flat gasket having a gasket body with a structure corresponding to that of the gasket body of the flat gasket 90 in FIG. 9. First of all, as already described in Example 1, two composites were produced, each formed of a polymer foil and a metal foil. Thereafter, three metal foils (thickness 50 μm, material No. 1.4401), which were to be joined on both sides to graphite foils, as in the procedure of Example 1, were covered on both of their flat surfaces with a coating of a siloxane/fatty alcohol mixture.

A stack formed of the following sequence of layers was then produced: 1. composite sheet made of polymer foil and metal foil; 2. graphite foil (thickness 0.51 mm, bulk density 1.0 g/cm$^3$); 3. metal foil; 4. graphite foil as in 2.; 5. metal foil; 6. graphite foil as in 2.; 7. metal foil; 8. graphite foil as in 2.; 9. composite sheet made of polymer foil and metal foil.

As described in Example 1, this stack was transferred to a heated stamping press and there compressed to form a multilayer sheet. Gasket bodies in the form of a ring having an internal diameter of 49 mm and an external diameter of 92 mm were then punched out of this multilayer sheet. In order to produce the flat gaskets, the sides extending along the internal diameters of the gasket bodies were then provided with an eyelet made of special steel, as in the procedure described in Example 1.

Example 3

Like Example 1, flat gaskets corresponding to FIG. 11 were produced having gasket bodies which were formed of a core made of two graphite foils reinforced with a tanged metal sheet and of a coating of a polymer foil on both sides. To that end, first of all a core formed of two graphite foils and a tanged metal sheet was produced by the process described in Example 1. The body thus obtained was then thoroughly dried in a forced-air oven at 105° C. The graphite foil body reinforced with the tanged metal sheet was then wrapped in a polytetra-fluoroethylene foil of the type which was also used in the previous examples. The stack including the polymer foil and the core reinforced with the tanged metal sheet was transferred into a hot press die block that was previously heated to 375° C. and there compressed at a pressing power of 2 MPa for about 5 minutes. The graphite foils became welded to the polymer foils under these conditions. Gasket bodies (internal diameter 49 mm, external diameter 92 mm) were then produced by punching out of a multilayer sheet that was thus obtained and flat gaskets according to the invention were constructed therefrom by attaching to them on the inside eyelets according to the procedure in Example 1.

Example 4

Comparison

The multilayer sheet used to produce the gasket body of a flat gasket was the core of the gasket body of the flat gasket described in Example 1. In order to produce this core, two webs of graphite foil, having a thickness of 1.05 mm and a bulk density of 0.9 g/cm³, and a tanged metal sheet provided with tines on both sides and made of special steel, material no. 1.4401, which had a sheet thickness of 0.1 mm, were rolled together in a roll mill, through the use of a generally known process. The two rolls of the roll mill were adjusted to a gap width of 1.9 mm. The rolling was carried out in such a way as to produce a graphite foil body reinforced with a tanged metal sheet and having a graphite foil on both sides with a bulk density of 1.0 g/cm³. Annularly-shaped gasket bodies (internal diameter 49 mm, external diameter 92 mm) were produced from this multilayer sheet and these bodies were provided with an eyelet of special steel along their inside edges through the use of one of the conventional processes.

The following measurements were made on multilayer sheet test specimens which had been obtained as intermediate products in the production of the flat gaskets in Examples 1, 2 and 3:
  determination of the compressive strength in dependence on the temperature in accordance with DIN 28090-1; and
  determination of the compressibility performance and of the spring back performance at room temperature, at 150° C. and at 300° C. in accordance with DIN 28090-2.

The measured values of the compressive strength test are shown in Table 1.

TABLE 1

Critical surface pressure (MPa) at the moment of failure of the multilayer sheet

| Multilayer sheet according to | Temperature | | |
|---|---|---|---|
| | 20° C. | 150° C. | 300° C. |
| Example 1 | 148 | 130 | 118 |
| Example 2 | 138 | 120 | 112 |
| Example 3 | 119 | 88 | 71 |

It can be seen that the multilayer sheets have a high compressive strength at all temperatures. However, the multilayer sheet which does not have the metal foils in the two outer layers has lower compressive strengths, which also decline more sharply with higher temperatures. Table 2 shows measured values characterizing the compression performance and the spring back performance at room temperature and at 150° C. The measurements were carried out on the multilayer sheets from which the gasket bodies are formed:

TABLE 2

Values of compression modulus $\epsilon_{KSW}$ and percentage creep relaxation EKRW at room temperature (20° C.) and values of compression modulus $\epsilon_{WSW}$ and percentage creep relaxation $\epsilon_{WRW}$ at an elevated temperature of 150° C., with measurements in accordance with DIN 28090-2

| Multilayer Sheet according to | 20° C. | | 150° C. | |
|---|---|---|---|---|
| | $\epsilon_{KSW}$ (%) | $\epsilon_{KRW}$ (%) | $\epsilon_{WSW}$ (%) | $\epsilon_{WRW}$ (%) |
| Example 1 | 18.8 | 4.5 | 1.5 | 4.1 |
| Example 2 | 20.1 | 4.7 | 0.8 | 4.4 |
| Example 3 | 34.5 | 3.9 | 1.3 | 3.6 |

Values of $\epsilon_{KSW}$ and $\epsilon_{WSW}$ are measured at a surface pressure of 20 MPa in accordance with DIN 29091-3

The measured values for the compression performance and the spring back performance at room temperature and at 300° C. can be seen in Table 3.

TABLE 3

Values of compression modulus $\epsilon_{KSW}$ and percentage creep relaxation $\epsilon_{KRW}$ at room temperature (20° C.) and values of compression modulus $\epsilon_{WSW}$ and percentage creep relaxation $\epsilon_{WRW}$ at an elevated temperature of 300° C., with measurements in accordance with DIN 28090-2

| Multilayer Sheet according to | 20° C. | | 150° C. | |
|---|---|---|---|---|
| | $\epsilon_{KSW}$ (%) | $\epsilon_{KRW}$ (%) | $\epsilon_{WSW}$ (%) | $\epsilon_{WRW}$ (%) |
| Example 1 | 26.1 | 4.0 | 2.8 | 4.2 |
| Example 2 | 23.8 | 4.3 | 3.7 | 4.5 |
| Example 3 | 39.1 | 3.5 | 2.2 | 3.8 |

Values of $\epsilon_{KSW}$ are measured at a surface pressure of 35 MPa in accordance with DIN 28091-4
Values of $\epsilon_{WSW}$ are measured at a surface pressure of 50 MPa in accordance with DIN 28091-4

Explanatory notes to Tables 2 and 3:
  Values of compression modulus at room temperature $\epsilon_{KSW}$ and at elevated temperature $\epsilon_{WSW}$ are values which indicate the compressibility of the multilayer sheets at room temperature and at elevated temperature, respectively.
  Values of percentage creep relaxation at room temperature $\epsilon_{KRW}$ and at elevated temperature $\epsilon_{WRW}$ are values which indicate the spring back capacity of the multilayer sheets after prior compression at room temperature and at elevated temperature, respectively.

It follows from Tables 2 and 3 that the multilayer sheets of Examples 1 and 2 having outer layers which are formed of metal foils with polymer foils laminated thereon, are not as greatly compressed as is the multilayer sheet of Example 3, that does not have the metal foils in the two outer layers. The spring back capacity of the multilayer sheets according to the invention is good in all temperature ranges. Regarding the use of the multilayer sheets as gasket bodies of gaskets, this means that where there is stressing of flanges, correspondingly smaller distances are inevitably covered but the gaskets can be expected to have a good sealing effect. This holds for a temperature range extending from the lowest temperatures up to the respective temperature for long-term use which is between 150° C. and 300° C. and in special cases up to 400° C., depending upon the construction of the gasket body.

Figure 13:
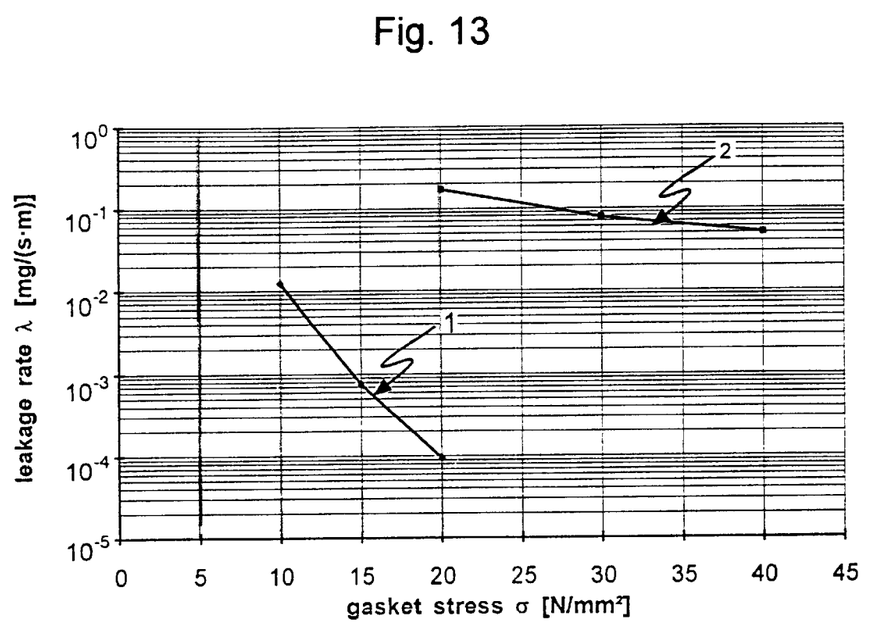
FIG. 13 is a diagram illustrating the sealing effect of a flat gasket having an inner eyelet made of special steel compared with a flat gasket having an inner eyelet according to the prior art.

FIG. 13 is a diagram which illustrates a sealing effect characterized by a specific leakage rate, for a flat gasket 1 having an inner eyelet made of special steel, material no. 1.4571, as in Example 1, or of a gasket corresponding to FIG. 12, but without an outer eyelet. That is compared by way of example with a flat gasket 2 having an inner eyelet according to the prior art with a gasket body that had been produced from a multilayer sheet formed as in Example 4, solely having two graphite foils with a tanged metal sheet disposed between them. Unlike the flat gasket according to the invention, the gasket used for the comparison lacked the coating on both sides with the metal foil joined to the polymer foil.

The test was carried out in accordance with DIN 28090. In this test the internal pressure of the gas was 40 bar. Nitrogen was used as the test gas. The great superiority of the flat gasket according to the invention can be clearly seen from the diagram, without further explanation. Even at comparatively low gasket stresses, it is therefore possible to achieve low leakage rates such as could never be achieved using the comparison multilayer sheets. Through the use of the flat gaskets according to the invention, it is possible to achieve leakage rates even of less than 0.001 mg/(s.m). They accordingly meet the highest requirements.

We claim:

1. In a flat gasket for sealing at least one cavity, the improvement comprising:
    a gasket body including a pressure-resistant core, having long-term resistance to temperatures of at least 150° C. and two flat outer sides, and two coverings each completely covering a respective one of said flat outer sides, said coverings formed of a gas-tight foil of an organic polymer having a long-term temperature resistance of at least 150° C.; and
    at least one eyelet gas-tightly enclosing said gasket body and a portion of said gas-tight foil of said gasket body.

2. The flat gasket according to claim 1, wherein said at least one eyelet is at least one inner eyelet positioned between said gasket body and said at least one cavity.

3. The flat gasket according to claim 2, wherein said core is made of a material selected from the group consisting of thermoplastic synthetic material reinforced by organic fibers, thermoplastic synthetic material reinforced by inorganic fibers, elastomer reinforced by organic fibers and elastomer reinforced by inorganic fibers.

4. The flat gasket according to claim 3, wherein:
    said reinforcing fibers of said core are fibers selected from the group consisting of aramide fibers, glass fibers, ceramic fibers, carbon fibers, graphite fibers and metal fibers; and
    said thermoplastic synthetic material and said elastomer are made of a material selected from the group consisting of nitrile-butadiene rubber, styrene-butadiene rubber, natural rubber, ethylene-propylene terpolymer, ethylene-vinyl acetate copolymer, fluorinated rubber, fluorosilicone rubber, vinyl-containing dimethylpolysiloxane, acrylic rubber and ethylene-acrylic rubber.

5. The flat gasket according to claim 4, wherein said core contains fillers having a long-term temperature resistance of at least 150° C., in addition to said reinforcing fibers.

6. The flat gasket according to claim 3, wherein said core contains fillers having a long-term temperature resistance of at least 150° C., in addition to said reinforcing fibers.

7. The flat gasket according to claim 6, including metal foils each completely covering a respective one of said outer flat sides of said core and forming an outer boundary of said core.

8. The flat gasket according to claim 3, including metal foils each completely covering a respective one of said outer flat sides of said core and forming an outer boundary of said core.

9. The flat gasket according to claim 8, wherein said core is bonded to said covering by an adhesive.

10. The flat gasket according to claim 8, wherein said core is joined to said covering without an adhesive.

11. The flat gasket according to claim 3, wherein said core is bonded to said covering by an adhesive.

12. The flat gasket according to claim 3, wherein said core is joined to said covering without an adhesive.

13. The flat gasket according to claim 12, wherein said core is welded to said covering.

14. The flat gasket according to claim 3, wherein said polymer foil coverings are made of a material selected from the group consisting of polyarylether ether ketone, polyaryl ether ketone, polyphenylene sulfide, polyaryl sulfone, polyether sulfone, polyimide, polyamide imide and fluorine-containing polymers.

15. The flat gasket according to claim 2, wherein said core is made of a material selected from the group consisting of carbon, graphite and mica.

16. The flat gasket according to claim 15, wherein said core is formed of at least one layer of graphite foils produced from expanded graphite.

17. The flat gasket according to claim 16, including metal foils each completely covering a respective one of said outer flat sides of said core and forming an outer boundary of said core.

18. The flat gasket according to claim 15, including metal foils each completely covering a respective one of said outer flat sides of said core and forming an outer boundary of said core.

19. The flat gasket according to claim 18, wherein said core is joined to said covering without an adhesive.

20. The flat gasket according to claim 2, including metal foils each completely covering a respective one of said outer flat sides of said core and forming an outer boundary of said core.

21. The flat gasket according to claim 2, wherein said core is formed of different layers disposed alternatingly one upon another and parallel, and said different layers include layers made of inorganic, pressure-resistant material resistant to high temperatures, and metal foils.

22. The flat gasket according to claim 21, wherein said layers of said inorganic, pressure-resistant material resistant to high temperatures are joined to said metal foils in said core.

23. The flat gasket according to claim 22, wherein said layers of said inorganic, pressure-resistant material resistant to high temperatures are bonded to said metal foils by an adhesive in said core.

24. The flat gasket according to claim 23, wherein said inorganic, pressure-resistant material resistant to high temperatures is at least one graphite foil.

25. The flat gasket according to claim 21, wherein said metal foils include two outer layers of said core completely covering said flat sides of said core.

26. The flat gasket according to claim 25, wherein said inorganic, pressure-resistant material resistant to high temperatures is at least one graphite foil.

27. The flat gasket according to claim 26, wherein said core is joined to said covering without an adhesive.

28. The flat gasket according to claim 27, wherein said core is welded to said covering.

29. The flat gasket according to claim 27, wherein said at least one graphite foil is joined to said metal foils by rolling, applying pressure and elevated temperature.

30. The flat gasket according to claim 29, wherein:
said metal foils are made of a material selected from the group consisting of corrosion-resistant metals, corrosion-resistant metal alloys, aluminum, aluminum alloys, copper and copper alloys, and said metal foils have a thickness within a range of 0.005 mm to 1 mm;
said at least one graphite foil has a bulk density within a range of 0.1 g/cm$^3$ to 1.8 g/cm$^3$ and a carbon content of from 90 to 99.95 per cent by weight, and said at least one graphite foil has a thickness of from 0.1 mm to 4.0 mm;
said polymer foil coverings are made of a material selected from the group consisting of polyarylether ether ketone, polyaryl ether ketone, polyphenylene sulfide, polyaryl sulfone, polyether sulfone, polyimide, polyamide imide and fluorine-containing polymers, and said polymer foil coverings have a thickness within a range of 0.005 mm to 1.0 mm; and
said at least one inner eyelet is made of metal.

31. The flat gasket according to claim 27, wherein said at least one graphite foil is joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat.

32. The flat gasket according to claim 31, wherein:
said metal foils are made of a material selected from the group consisting of a corrosion-resistant metals, corrosion-resistant metal alloys, aluminum, aluminum alloys, copper and copper alloys, and said metal foils have a thickness within a range of 0.005 mm to 1 mm;
said at least one graphite foil has a bulk density within a range of 0.1 g/cm$^3$ to 1.8 g/cm$^3$ and a carbon content of from 90 to 99.95 per cent by weight, and said at least one graphite foil has a thickness of from 0.1 mm to 4.0 mm;
said polymer foil coverings are made of a material selected from the group consisting of polyarylether ether ketone, polyaryl ether ketone, polyphenylene sulfide, polyaryl sulfone, polyether sulfone, polyimide, polyamide imide and fluorine-containing polymers, and said polymer foil coverings have a thickness within a range of from 0.005 mm to 1.0 mm; and
said at least one inner eyelet is made of metal.

33. The flat gasket according to claim 27, wherein said gasket body and said at least one inner eyelet together have a permeability in accordance with DIN 3535 of at most 0.1 ml/min.

34. The flat gasket according to claim 26, wherein said at least one graphite foil is a plurality of graphite foils, and at least one of said metal foils is disposed in the interior of said core and is a tanged metal sheet having two sides each joined to a respective one of said graphite foils.

35. The flat gasket according to claim 34, including adhesive-free joinings of said graphite foils to said metal foils and adhesive-free joinings of said metal foils to said coverings.

36. The flat gasket according to claim 35, wherein said gasket body enclosed by said at least one inner eyelet includes:
one of said metal foils disposed centrally and having flat sides;
two layers of said graphite foils each joined to a respective one of said flat sides of said one metal foil and each having one flat outwardly-directed side; and
two other metal foils each joined to a respective one of said flat outwardly-directed sides of said two graphite foils and each having one flat outwardly-directed side each completely covered by and joined to a respective one of said polymer foil coverings without an adhesive.

37. The flat gasket according to claim 36, wherein said gasket body enclosed by said at least one inner eyelet includes:
said tanged metal sheet disposed centrally and having two sides;
two layers of said graphite foils each joined to a respective one of said two sides of said tanged metal sheet and each having one outwardly-directed side; and
two other metal foils each joined to a respective one of said flat outwardly-directed sides of said two graphite foils and each having one flat outwardly-directed side each completely covered by and joined to a respective one of said polymer foil coverings without an adhesive.

38. The flat gasket according to claim 26, including adhesive-free joinings of said at least one graphite foil to said metal foils and adhesive-free joinings of said metal foils to said coverings.

39. The flat gasket according to claim 38, wherein said gasket body enclosed by said at least one inner eyelet includes:
one of said metal foils disposed centrally and having flat sides;
two layers of said at least one graphite foil each joined to a respective one of said flat sides of said one metal foil and each having one flat outwardly-directed side; and
two other metal foils each joined to a respective one of said flat outwardly-directed sides of said two graphite foil layers and each having one flat outwardly-directed side each completely covered by and joined to a respective one of said polymer foil coverings without an adhesive.

40. The flat gasket according to claim 38, wherein said gasket body enclosed by said at least one inner eyelet includes:
one of said at least one graphite foil disposed centrally and having two flat surfaces; and
two of said metal foils each joined to a respective one of said two flat surfaces of said one graphite foil and each having one outwardly-directed surface each completely covered by and joined to a respective one of paid polymer foil coverings without an adhesive.

41. The flat gasket according to claim 26, wherein said gasket body enclosed by said at least one inner eyelet includes:

one of said metal foils disposed centrally and having flat sides;

two layers of said at least one graphite foil each joined to a respective one of said flat sides of said one metal foil and each having one flat outwardly-directed side; and two other metal foils each joined to a respective one of said flat outwardly-directed sides of said two graphite foils and each having one flat outwardly-directed side each completely covered by and joined to a respective one of said polymer foil coverings without an adhesive.

42. The flat gasket according to claim 26, wherein said at least one graphite foil is joined to said metal foils by rolling, applying pressure and elevated temperature.

43. The flat gasket according to claim 26, wherein said at least one graphite foil is joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat.

44. The flat gasket according to claim 26, wherein said polymer foil coverings have a thickness within a range of 0.005 mm to 1.0 mm, said metal foils have a thickness within a range of 0.005 mm to 1 mm, and said at least one graphite foil has a thickness of from 0.1 mm to 4.0 mm.

45. The flat gasket according to claim 26, wherein said polymer foil coverings are made of a material selected from the group consisting of polyarylether ether ketone, polyaryl ether ketone, polyphenylene sulfide, polyaryl sulfone, polyether sulfone, polyimide, polyamide imide and fluorine-containing polymers, and said polymer foil coverings have a thickness within a range of 0.005 mm to 1.0 mm.

46. The flat gasket according to claim 26, wherein said at least one inner eyelet is made of metal.

47. The flat gasket according to claim 25, wherein said core is bonded to said covering by an adhesive.

48. The flat gasket according to claim 25, wherein said core is joined to said covering without an adhesive.

49. The flat gasket according to claim 48, wherein said core is welded to said covering.

50. The flat gasket according to claim 25, wherein said coverings are heat-welded to said metal foils being the outer layers.

51. The flat gasket according to claim 25, wherein said gasket body and said at least one inner eyelet together have a permeability in accordance with DIN 3535 of at most 0.1 ml/min.

52. The flat gasket according to claim 21, wherein said inorganic, pressure-resistant material resistant to high temperatures is mica.

53. The flat gasket according to claim 21, wherein said inorganic, pressure-resistant material resistant to high temperatures is at least one graphite foil.

54. The flat gasket according to claim 53, wherein said core is bonded to said covering by an adhesive.

55. The flat gasket according to claim 53, wherein said core is joined to said covering without an adhesive.

56. The flat gasket according to claim 55, wherein said core is welded to said covering.

57. The flat gasket according to claim 55, wherein said at least one graphite foil is a plurality of graphite foils and at least one of said metal foils is disposed in the interior of said core and is a tanged metal sheet having two sides each joined to a respective one of said graphite foils.

58. The flat gasket according to claim 55, wherein:

said metal foils have a thickness within a range of 0.005 mm to 1 mm;

said at least one graphite foil has a thickness of from 0.1 mm to 4.0 mm;

said polymer foil coverings are made of a material selected from the group consisting of polyarylether ether ketone, polyaryl ether ketone, polyphenylene sulfide, polyaryl sulfone, polyether sulfone, polyimide, polyamide imide and fluorine-containing polymers;

said polymer foil coverings have a thickness within a range of from 0.005 mm to 1.0 mm; and said at least one inner eyelet is made of metal.

59. The flat gasket according to claim 53, wherein said at least one graphite foil is joined to said metal foils by rolling, applying pressure and elevated temperature.

60. The flat gasket according to claim 53, wherein said at least one graphite foil has a thickness of from 0.1 mm to 4.0 mm, and said at least one graphite foil has a bulk density within a range of 0. 1 $g/cm^3$ to 1.8 $g/cm^3$ and a carbon content of from 90 to 99.95 per cent by weight.

61. The flat gasket according to claim 53, wherein said polymer foil coverings have a thickness within a range of 0.005 mm to 1.0 mm, said metal foils have a thickness within a range of 0.005 mm to 1 mm, and said at least one graphite foil has a thickness of from 0.1 mm to 4.0 mm.

62. The flat gasket according to claim 21, wherein said core is joined to said covering without an adhesive.

63. The flat gasket according to claim 62, wherein said core is welded to the covering.

64. The flat gasket according to claim 21, wherein said core has an interior with graphite foils, and at least one of said metal foils is disposed in said interior and is a tanged metal sheet having two sides each joined to a respective one of said graphite foils.

65. The flat gasket according to claim 21, wherein said metal foils have a thickness within a range of 0.005 mm to 1 mm, and said metal foils are made of a material selected from the group consisting of corrosion-resistant metals, corrosion-resistant metal alloys, aluminum, aluminum alloys, copper and copper alloys.

66. The flat gasket according to claim 21, wherein said polymer foil coverings are made of a material selected from the group consisting of polyarylether ether ketone, polyaryl ether ketone, polyphenylene sulfide, polyaryl sulfone, polyether sulfone, polyimide, polyamide imide and fluorine-containing polymers.

67. The flat gasket according to claim 66, wherein said polymer foil coverings are made of a perfluorinated organic polymer.

68. The flat gasket according to claim 66, wherein said polymer foil coverings have a thickness within a range of 0.005 mm to 1.0 mm.

69. The flat gasket according to claim 21, wherein said at least one inner eyelet is made of metal.

70. The flat gasket according to claims 21, wherein said at least one inner eyelet is made of a perfluorinated organic polymer.

71. The flat gasket according to claim 21, wherein said gasket body and said at least one inner eyelet together have a permeability in accordance with DIN 3535 of at most 0.1 ml/min.

72. The flat gasket according to claim 2, wherein said core is bonded to said covering by an adhesive.

73. The flat gasket according to claim 2, wherein said core is joined to said covering without an adhesive.

74. The flat gasket according to claim 73, wherein said core is welded to said covering.

75. The flat gasket according to claim 2, wherein said polymer foil coverings are made of a material selected from the group consisting of polyarylether ether ketone, polyaryl ether ketone, polyphenylene sulfide, polyaryl sulfone, polyether sulfone, polyimide, polyamide imide and fluorine-containing polymers.

76. The flat gasket according to claim 75, wherein said polymer foil coverings are made of a material selected from the group consisting of polytetrafluoro-ethylene, polytrifluorochloroethylene, tetrafluoroethylenehexafluoropropylene copolymer, copolymers of tetrafluoroethylene with perfluoroalkyl vinyl ether, polyvinylidene fluoride and copolymers of ethylene and tetrafluoro-ethylene.

77. The flat gasket according to claim 76, wherein said polymer foil coverings are made of a perfluorinated organic polymer.

78. The flat gasket according to claim 75, wherein said polymer foil coverings have a thickness within a range of 0.005 mm to 1.0 mm.

79. The flat gasket according to claim 2, wherein said at least one inner eyelet is made of metal.

80. The flat gasket according to claim 79, wherein said at least one inner eyelet is made of a corrosion-resistant metal.

81. The flat gasket according to claim 2, wherein said at least one inner eyelet is made of a perfluorinated organic polymer.

82. The flat gasket according to claim 2, wherein said gasket body and said at least one inner eyelet together have a permeability in accordance with DIN 3535 of at most 0.1 ml/min.

83. The flat gasket according to claim 1, including metal foils each completely covering a respective one of said outer flat sides of said core and forming an outer boundary of said core.

84. The flat gasket according to claim 83, wherein said coverings are heat-welded to said metal foils forming an outer boundary of said core.

85. The flat gasket according to claim 1, wherein said core is formed of different layers disposed alternatingly one upon another and parallel, and said different layers include layers made of inorganic, pressure-resistant material resistant to high temperatures, and metal foils.

86. The flat gasket according to claim 85, wherein said metal foils include two outer layers of said core completely covering said flat sides of said core.

87. The flat gasket according to claim 86, wherein said inorganic, pressure-resistant material resistant to high temperatures is mica.

88. The flat gasket according to claim 86, wherein said inorganic, pressure-resistant material resistant to high temperatures is at least one graphite foil.

89. The flat gasket according to claim 88, wherein said core is joined to said covering without an adhesive.

90. The flat gasket according to claim 89, including adhesive-free joinings of said at least one graphite foil to said metal foils and adhesive-free joinings of said metal foils to said coverings.

91. The flat gasket according to claim 85, wherein said inorganic, pressure-resistant material resistant to high temperatures is at least one graphite foil.

92. The flat gasket according to claim 91, including adhesive-free joinings of said at least one graphite foil to said metal foils and adhesive-free joinings of said metal foils to said coverings.

93. The flat gasket according to claim 91, wherein said at least one graphite foil is joined to said metal foils by applying a contact-surface active agent selected from the group consisting of organosilicon compounds, perfluorinated compounds and metal soaps in a thin layer to at least one of said graphite and metal foils and then bringing said graphite and metal foils into contact with pressure and heat.

94. The flat gasket according to claim 85, wherein said core is bonded to said covering by an adhesive.

95. The flat gasket according to claim 1, wherein said gasket body and said at least one eyelet together have a permeability in accordance with DIN 3535 of at most 0.1 ml/min.

96. The flat gasket according to claim 1, wherein one of said two coverings is an upper surface covering and another one of said two coverings is a lower surface covering.

* * * * *